ENGINE IGNITION AND POWER TESTING APPARATUS

Original Filed April 16, 1945 2 Sheets-Sheet 1

INVENTOR
ROBERT L. SEXTON
BY Paul B. Hunter
ATTORNEY

ENGINE IGNITION AND POWER TESTING APPARATUS

Original Filed April 16, 1945 2 Sheets-Sheet 2

INVENTOR
ROBERT L. SEXTON
BY Paul B. Hunter
ATTORNEY

Reissued Sept. 20, 1949

Re. 23,150

UNITED STATES PATENT OFFICE 23,150

ENGINE IGNITION AND POWER TESTING APPARATUS

Robert L. Sexton, Port Washington, N. Y., assignor to John E. Lindberg, Jr., Redwood City, Calif.

Original No. 2,445,245, dated July 13, 1948, Serial No. 588,565, April 16, 1945. Application for reissue June 9, 1949, Serial No. 98,071

4 Claims. (Cl. 73—116)

This invention relates generally to internal combustion engine testing apparatus, and the invention has reference more particularly to a novel aircraft engine ignition and cylinder power testing apparatus.

It is extremely important in modern internal combustion engines, and especially aircraft engines, that the same be kept operating efficiently and with as short shutdowns for repairs as possible. The investment in modern large airplanes is so great that it is necessary to keep the planes in the air approximately seventy per cent of the time in order to recoup the investment made in the airplane, and hence it becomes very important that engine overhaul periods be shortened as much as possible.

When it is realized that ignition troubles are the cause of more engine failures than any other factor, the importance of easily detecting and locating ignition troubles becomes very apparent. The present methods of shooting ignition trouble are arduous and consume considerable time. For example, assuming an eighteen-cylinder aircraft engine is "rough on the left magneto," which would tend to indicate that a rear plug is fouled, in that case, under the present system of testing, eighteen spark plugs are usually changed, where actually only one plug is at fault. This makes ignition repair work on airplane engines not only a lengthy matter, but also expensive. Furthermore, cylinders very often fall off in power, and up to the time of this invention it was impossible to determine readily just which cylinder was falling off in power and to what extent. Furthermore, faulty ignition results in local radio interference, which is highly objectionable, especially in aircraft.

The applicant hereof has discovered means whereby the ignition of any one selected cylinder may be isolated, so to speak, even while the engine is running, and tested for faulty action. In the event of such faulty action, it is known definitely just where the trouble lies, so that careful and tedious examination of all spark plugs in all cylinders is unnecessary.

An important feature of the present invention is to provide novel engine ignition and power testing apparatus which enables the engine operator to select any cylinder in which he is interested and then by merely pressing a button determine whether or not the ignition in that cylinder is faulty. In the event of dual ignition, the pressure of two buttons will determine whether or not the ignition of the cylinder is faulty, whereupon the pressing of the two buttons alternately will determine which plug in such cylinder is faulty, so that an airplane operator is able to note, even while in flight, which of the thirty-six plugs in an eighteen-cylinder engine is faulty by merely pressing buttons, thereby enabling the replacement of a single defective plug without replacing eighteen plugs.

A further feature of the present invention is to provide test equipment for checking on the torque and power output of any desired cylinder of an engine, for example, if it happens to be an eighteen-cylinder engine, the engine operator may select any cylinder and determine its torque and power output. In that way he readily determines whether a cylinder is performing properly, and thereby foretell failures.

Very often, a cylinder will gradually fall off in power, and this may be true of a number of cylinders, so that the overall power of the engine falls off and yet the trouble is not sufficiently bad to warrant complete overhaul of the engine. By using the test equipment of the present invention, any cylinder or cylinders falling off in power can be quickly detected and correction made. Furthermore, detonation resulting in loss of power can be detected and located.

A further feature of the present invention is to provide a small, inexpensive, compact, and light test equipment that is readily applied to existing engine installations, and is easily operated for testing and locating ignition troubles and defective cylinders, even while the engine is running, thereby greatly decreasing the maintenance time heretofore required in servicing airplanes and cutting the cost of maintenance enormously.

Other features and advantages will become apparent from the specification, taken in connection with the accompanying drawings wherein the invention is embodied in concrete form.

In the drawings.

Similar characters of reference are used in all of the above figures to indicate corresponding parts.

Figures 1, 1A:
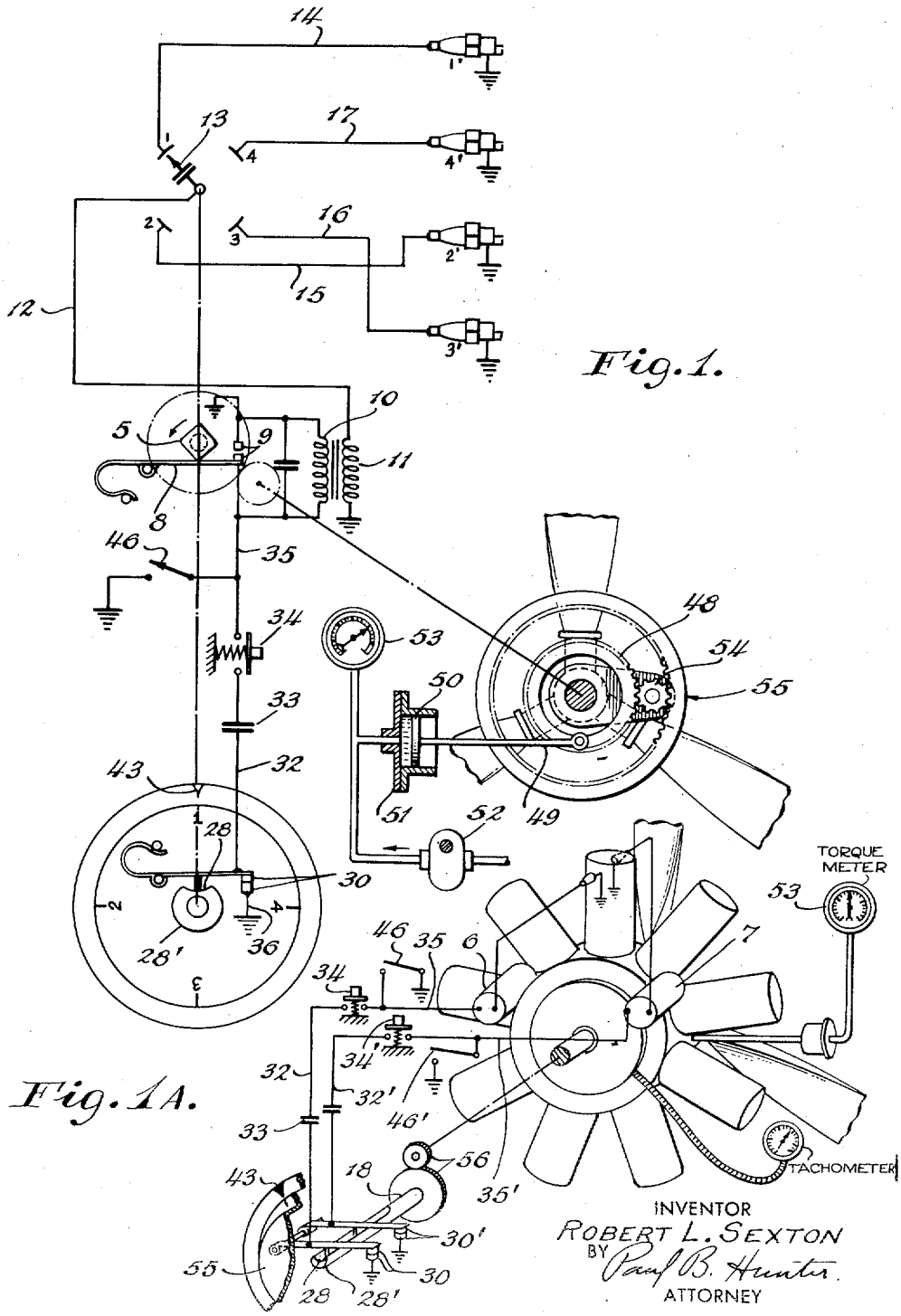
Fig. 1 is a schematic view of the novel engine ignition apparatus of this invention shown as applied to a four-cylinder engine.
Fig. 1A is a diagrammatic view showing the apparatus of the present invention applied to a dual-ignition nine-cylinder aircraft engine.

Referring now to the drawings, the reference numeral 5 designates a contact breaker cam of the engine magneto which, as shown in Fig. 1A, may be magneto 6 or 7. The cam 5 is adapted to actuate the breaker arm 8 for opening and closing the contact breaker points 9 located in the circuit of the primary winding 10 of the magneto. As is customary, when the primary contact points 9 open, the flow of primary current through coil 10 is interrupted, causing an extremely rapid change in flux linkages, resulting in the production of a high voltage in the secondary winding 11 of the magneto, which voltage is supplied through lead 12 to the distributor finger 13 for passage through distributor contacts 1, 2, 3, and 4 and connected high tension leads 14, 15, 16, and 17 to engine spark plugs 1', 2', 3', and 4'. So far the structure is typical of an engine ignition system.

Figure 2:
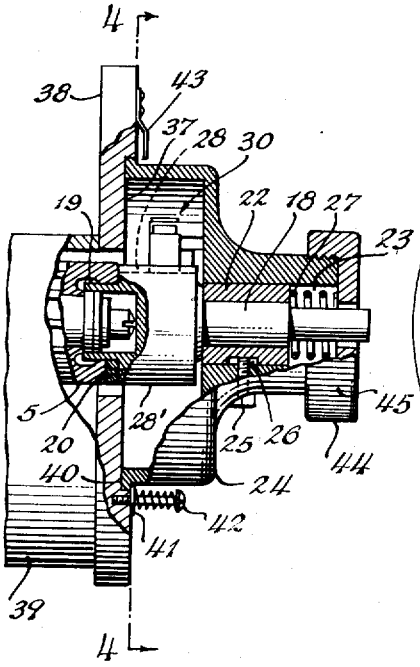
Fig. 2 is a fragmentary sectional view of a portion of the apparatus.

In its preferred form, the apparatus of the present invention is an attachment comprising an auxiliary cam shaft 18 having an enlarged hollow inner end portion 19 which fits within a recess provided in the outer end of the magneto breaker cam 5 (see Fig. 2), the said auxiliary shaft 18 having a driving block or key 20 adapted to fit into a slot provided in the end of the contact breaker cam 5, whereby this breaker cam drives the auxiliary cam shaft 18.

Shaft 18 is mounted on a rotor-bearing block 22 which abuts the enlarged end portion 19. Bearing block 22 is longitudinally slidable in slide-bearing aperture 23 provided in a bell housing 24. A screw 25 extends through housing 24 and projects into a longitudinal groove 26 in rotor bearing 22, thereby serving to prevent the turning of this bearing while permitting longitudinal movement thereof. A coil compression spring 27 presses on the rotor-bearing block 22 and hence urges the enlarged end portion 19 of shaft 18 inwardly toward and into engagement continuously with the contact breaker cam 5 to be driven by the latter.

Figure 4:
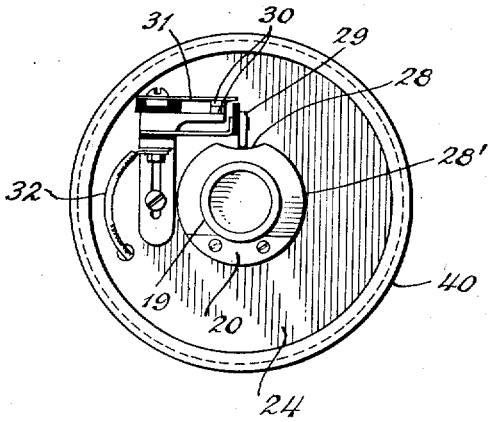
Fig. 4 is an elevational view of a part of the structure of Fig. 2 as taken substantially along the lines 4—4 of Fig. 2.

The enlarged portion 19 of auxiliary cam shaft 18 is provided with a peripheral longitudinal cam groove or depression 28 (see especially Fig. 4) which cooperates with a cam follower 29 that serves to actuate a pair of breaker points 30. So long as the follower 29 is riding on the high surface 28' of the cam shaft portion 19, the follower 29 holds the breaker points 30 disengaged by flexing arm 31 upwardly. However, when the cam groove 28 rides under the follower 29, this follower drops down into groove 28 and allows the resilient arm 31 to move downwardly, thereby engaging points or contacts 30 as shown in Fig. 4. These breaker points are connected at one side (see Fig. 1) through a lead 32, condenser 33, push-button 34, and lead 35 to one side of the primary winding 10. The other side of the breaker points 30 are connected by lead 36 to ground.

The bell housing 24 is shown on its exterior surface provided with numerals 1, 2, 3 and 4 (see Fig. 3) corresponding to the number of cylinders shown in the structure of Fig. 1, wherein a four-cylinder engine is involved, which numerals correspond to and are arranged in the firing order of the engine cylinders. The open mouth of this bell housing fits into a circular depression 37 provided in a plate 38 attached to the end of the magneto housing 39. The bell housing has a radial lip or flange 40 that is engaged by spring-pressed washers 41 carried by screws 42, which serve to retain the open mouth portion of the bell housing in assembled relation with the plate 38 and rotatable with respect to this plate. An index member or pointer 43 is carried by the plate 38 for cooperating with the marks 1, 2, 3 and 4 on the periphery of the bell housing 24. Obviously, if the engine had eighteen cylinders, there would be eighteen numbers on the bell housing 24.

Figure 3:
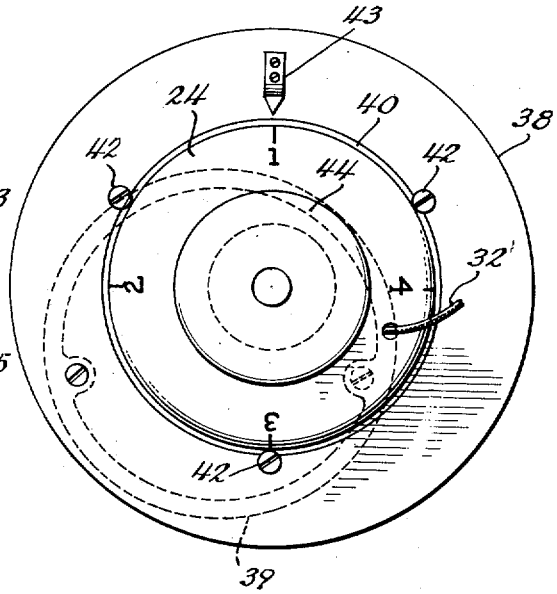
Fig. 3 is an end view of the structure shown in Fig. 2.

An outer end cover or knob 44 is fixedly mounted upon the bell housing 24 and has a knurled outer surface 45 which may be grasped for turning this bell housing so that any particular cylinder number, such as 1, may be aligned with the pointer 43 as shown in Fig. 3. With such position of the bell housing, the cam follower 29 is so positioned angularly with respect to the contact breaker cam 5 and cam groove 28 of the auxiliary cam that when cylinder 1 of the engine fires, the cam follower 29 will drop into cam slot 28, thereby closing contact points 30 at the very moment that the spark plug in cylinder 1 fires. However, this action has no effect so long as the push-button 34 is open. If push-button 34 is held closed, then every time cylinder 1 is about to fire both sides of the primary winding 10 will be grounded because (referring particularly to Fig. 1) with the contact points 30 closed and switch 34 closed, the lower side of the primary winding 10, as shown in Fig. 1, is grounded and its other side is always grounded, and so no voltage is induced in the secondary 11 and consequently the plug or cylinder 1 will receive no secondary current and hence will not fire.

Likewise, if the knob 44 is turned so as to bring the number 2 on bell housing 24 opposite pointer 43, then each time that cylinder number 2 fires, the contact points 30 will be closed, and if the push-button 34 is also closed at that time, the plug or cylinder number 2 will not fire since both sides of the primary winding 10 are shorted.

When applying the device to a dual-ignition engine as shown in Fig. 1A, two sets of contact points 30 and 30' are employed and likewise two push-buttons 34 and 34' are employed, leads 35 and 35' connecting to the primary winding of the two magnetos 6 and 7. Only two high tension leads of these two magnetos are shown in Fig. 1A connected to a single cylinder, but it will be understood that leads are connected to each of the cylinders. A switch 46 is shown for permanently grounding the primary 10 of the magneto when desired. In Fig. 1A, the auxiliary cam shaft 18 is shown driven directly from the engine through reduction gearing 56 instead of from the magneto.

A torque meter is attached to the engine to indicate the brake mean effective pressure (B. M. E. P.) or the pressure component of torque in pounds per square inch. This torque meter is illustrated as comprising a sun gear 48, which is attached by linkage 49 to a plunger 50 working within hydraulic cylinder 51 which is supplied with oil under pressure by pump 52, and a pressure gauge 53, which may read directly in torque units, if desired, is connected to the cylinder 51. A pinion 54 meshes with the sun gear 48 and with the propeller drive gear 55 so that the torque applied to the propeller is transmitted through pinion 54 and gear 48 to plunger 50, whereby meter 53 reads the torque of the engine or may be calibrated in pressure units, if desired.

From the reading of meter 53, the brake horsepower of the engine can be readily calculated as follows:

$$\text{B. H. P.} = \frac{(T) \times (2\pi) \times (\text{R. P. M.})}{33{,}000}$$

wherein T represents the torque. In operation, to determine whether or not the spark plug of a cylinder is functioning properly, it is merely necessary to turn the knob 44 until the desired cylinder number, such as number 1, is opposite the index 43 as shown in Figs. 1 and 3. The brake mean effective pressure (B. M. E. P.) is read from the torque meter 53. The push-button 34 shown in Fig. 1 is then depressed so as to ground both sides of the primary 10, thereby shutting off the high tension power to the plug of cylinder 1. The B. M. E. P. reading of meter 53 is again noted during the ignition cutout of cylinder 1. The difference between the first B. M. E. P. reading and the second represents the loss in torque, which can be converted to horsepower as follows:

$$\frac{\text{Lost B. M. E. P.} \times \text{R. P. M.}}{R} = \text{B. H. P. lost}$$

wherein $$\frac{1}{R}$$

represents the engine factor which does not change.

For a good cylinder the value of B. H. P. lost should equal $$\frac{\text{B. H.P.}}{K}$$

where K equals the number of cylinders of the engine. If there is no falling off of the indicated B. M. E. P. when closing the push-button 34, the particular cylinder being tested is not putting out power. If the cylinder is operating properly there should be a drop in B. M. E. P. which is equal to the original B. M. E. P. reading divided by the number of cylinders in the engine. Thus, this testing device is very rapid in its action and cylinders can be tested as rapidly as the engineer can turn the knob 44 to successive cylinder numbers and press the button 34 and read the meter 53.

Where dual ignition is used, as shown in Fig. 1A, to locate the cylinders having faulty ignition, both buttons 34 and 34' are pressed or closed simultaneously, thereby grounding the corresponding plugs of cylinder 1, for example, simultaneously, whereupon the fall in B. M. E. P. is noted. If no fall is indicated, obviously no power is being received from that cylinder, which indicates any one or more of the following difficulties:

*a.* Poor compression,
*b.* Both spark plugs fouled simultaneously (very rare),
*c.* Mixture not reaching cylinder,
*d.* Spark plug wires broken or not hooked to plugs.

Assuming that the B. M. E. P. does fall to some extent when both plugs are grounded, the next step is to ground one plug, for example, the front plug only, by closing switch 34 alone. If now the B. M. E. P. does fall off, the rear plug has faulty ignition, and if the B. M. E. P. does not fall, the rear plug and ignition is all right. The push-buttom 34' is now closed, thereby grounding the rear plug, and the same procedure is repeated, thereby determining whether the front plug is firing properly. Thus, it is readily possible to determine which cylinder is not functioning properly, and if it is dual ignition it is readily determinable as to which of the two ignition systems is at fault as well as the particular plug which is faulty.

In making power tests, the engineer will press both buttons 34 and 34' simultaneously and note the B. M. E. P. drop, thereby determining the power output of any particular cylinder by the change in B. M. E. P. reading. By pushing the button 34, controlling the front plug, we can test the rear plug ignition, and by pushing the button 34', controlling the rear plug, we can test the front plug ignition.

The apparatus of this invention also serves for determining the location of faulty ignition causing radio interference. Where a dual-ignition system is employed, each magneto is grounded in turn by closing switches 46 and 46' in succession. By grounding switch 46, if the interference ends, it is known that the ignition trouble is in the system associated with switch 46. If the trouble still persists, then it is the ignition system associated with switch 46'. Each plug of the faulty ignition system is then grounded in turn to determine which plug is faulty. The connections to this plug are then checked as well as the plug to detect loose connections. Thus, it will be seen that merely by pressing buttons 34 and 34' the engineer can quickly determine which cylinder of a multi-cylinder engine is not functioning properly and then readily locate the plug of that particular portion of the ignition system which is at fault, thereby enabling the replacement of one plug instead of many plugs and eliminating the hunt and try methods at present employed.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Engine and ignition power testing apparatus comprising an auxiliary cam driven from the engine, contact points actuated by said auxiliary cam, a housing for carrying said contact points, said housing being angularly adjustable with respect to said auxiliary cam to thereby effect the closing of said contact points simultaneously with the firing of any selected engine cylinder, a circuit connecting the engine ignition through said contact points to ground, switch means in said circuit for closing said circuit to cut off the ignition of such selected cylinder, and a torque indicator operable from the engine, for showing changes in the torque output of the engine responsive to the operation of said switch means.

2. In apparatus of the character described for testing of engine cylinders, contact means connected at one side with the engine ignition and at the other side with ground, adjustable means for setting said contact means for operation in synchronism with the firing of any selected engine cylinder, whereby the ignition of such cylinder is cut out when desired, and a torque meter attached to the engine for indicating change in engine torque with the cutting out of the ignition of such selected cylinder.

3. Apparatus for shutting off the supply of high tension current to engine spark plugs during engine operation comprising a grounding circuit electrically connected with the spark plugs, said circuit comprising make and break contact members actuated from the engine and switch means for completing said circuit, means for adjusting said contact members for causing actuation of the same in synchronism with the firing of any selected spark plug, whereby the closing of said switch means serves to shut off the current to the spark plug selected, and a torque meter driven from the engine for indicating change in engine torque upon the closing of said switch means.

4. In apparatus of the character described for testing of engine cylinders, ignition short circuiting means connected at one side with the ignition and at the other side with ground, adjustable means for setting said ignition short circuiting means for operation in synchronism with the firing of any selected engine cylinder, whereby the ignition of such cylinder is cut out when desired, and a torque meter attached to the engine for indicating change in engine torque with the cutting out of ignition of such selected cylinder.

ROBERT L. SEXTON.

REFERENCES CITED

The following references are of record in the file of this patent:

UNITED STATES PATENTS

| Number | Name | Date |
|---|---|---|
| 1,639,603 | Gowland | Aug. 16, 1927 |
| 2,274,086 | Morrison | Feb. 24, 1942 |

FOREIGN PATENTS

| Number | Country | Date |
|---|---|---|
| 139,829 | Great Britain | Mar. 18, 1920 |